United States Patent [19]

Rogers

[11] 4,383,727
[45] May 17, 1983

[54] INFRA-RED OPTICAL SYSTEMS

[75] Inventor: Philip J. Rogers, Bodelwyddan, Wales

[73] Assignee: Pilkington P.E. Limited, St. Helens, Great Britain

[21] Appl. No.: 175,758

[22] Filed: Aug. 6, 1980

[30] Foreign Application Priority Data

Aug. 8, 1979 [GB] United Kingdom ............... 7927675
Jul. 24, 1980 [GB] United Kingdom ............... 8024209

[51] Int. Cl.$^3$ .............................................. G02B 3/00
[52] U.S. Cl. ...................................... 350/1.3; 350/1.4
[58] Field of Search ................................. 350/1.2–1.4

[56] References Cited

U.S. PATENT DOCUMENTS

| 4,050,779 | 9/1977 | Fleischman | 350/1.2 |
| 4,199,217 | 4/1980 | Rogers | 350/1.2 |
| 4,201,440 | 5/1980 | Yuta | 350/1.2 |

Primary Examiner—Bruce Y. Arnold
Attorney, Agent, or Firm—F. Eugene Davis, IV

[57] ABSTRACT

An "eye-piece" system for an infra-red afocal telescope comprises a positive back element having a concave or convex back surface and a convex front surface, and a pair of elements closely spaced to define a gas lens therebetween, the back element of the pair having a convex back surface and the front element of the pair having a concave front surface, the pair of elements in combination with the gas lens therebetween being of positive power. The "eye-piece" system can be used in combination with an objective lens system to provide a collimated magnified view of a scene or object, from which infra-red radiation is received, at a real exit pupil where a scanner operates, and can provide a wide field of view of around 70 degrees or more in the scanner space.

26 Claims, 2 Drawing Figures 4,383,727

INFRA-RED OPTICAL SYSTEMS

BACKGROUND OF THE INVENTION

This invention concerns improvements in or relating to infra-red optical systems and relates more particularly to afocal optical systems for use at infra-red wavelengths.

Afocal optical systems, i.e. systems having an infinite focal length and therefore no apparent focussing action, are well known per se and are used in several applications. The present invention relates to such a system which can be used, in particular, in circumstances where it is required that a beam of infra-red radiation from a distant source and incident on the optical system be reduced in diameter. Such reduction of beam diameter enables a comparatively small, high speed reflective scanning system to be employed in order to provide the requisite scanning of the field of view across an imaging lens plus line detector array.

An optical scanning head of constant angular motion has to operate in a collimated radiation section in order to maintain focus across the field of view and minimise image distortion. An essential in order to prevent vignetting is that the exit pupil of the afocal system should be coincident with the operative facet of the scanning head, i.e. its in-action reflective facet. In order to give a good field of view in the real world and also to minimise the number of facets on the scanning head, a wide field of view is required in the image space of the afocal system. The afocal optical system must, therefore, be capable of providing a wide image space field angle at an external exit pupil that is situated a convenient distance after the last optical element of the system.

Further, the space in which the afocal system is to be fitted is usually very limited, and this introduces a requirement for a compact length. Also, the image quality given by the afocal system should be close to the limit set by diffraction as this quality is not particularly high because of the long wavelength of the infra-red radiation.

It has previously been proposed in United States Patent Application Ser. No. 906,439, now U.S. Pat. No. 4,199,217, to provide an "eye-piece" system for a non-Gallilean afocal infra-red optical system, otherwise referred to as an infra-red afocal telescope, which "eye-piece" system comprises a back lens element of positive power having a back surface which is convex or concave and a front surface which is convex, and a front lens element which is of meniscus form having a back surface which is convex and a front surface which is concave with the radius of curvature of the convex back surface greater than that of the concave front surface but the thickness of the front element being such as to give it positive power.

In that application, and in the present description, the term "eye-piece" is used although the ultimate image is not viewed by the human eye but is, for example, scanned across an infra-red detector array, and the term is to be construed accordingly. Also in that application, and in the present description, the front of the system is considered to face towards the scene or object from which infra-red radiation is received while the back of the system is considered to face towards the exit pupil. The terms front and back when used in particular in relation to elements of the system and to the surfaces of such elements are to be construed accordingly.

An "eye-piece" system as described in United States Patent Application Ser. No. 906,439 can allow high correction of both real world and exit pupil imaging for fields of view of up to about 60 degrees in the scanner space, but beyond that angle pupil aberrations can become excessive. In some circumstances there is a requirement for even greater fields of view, for example of about 70 degrees or more.

SUMMARY

According to the present invention there is provided an "eye-piece" system for use in a non-Gallilean afocal infra-red optical system or afocal infra-red telescope, the "eye-piece" system comprising at least three lens elements including a back element of positive power having a back surface which is either convex or concave, and a front surface which is convex, and a pair of elements which are closely spaced to define a gas lens therebetween, the back element of the pair having a convex back surface and the front element of the pair having a concave front surface, the pair of elements in combination with the gas lens therebetween being of positive power.

Further according to the invention there is provided an "eye-piece" system for use in a non-Gallilean afocal infra-red optical system or afocal infra-red telescope, the "eye-piece" system comprising at least three lens elements including a back element of positive power having a back surface which is either convex or concave, and a front surface which is convex, and a pair of elements which are closely spaced to define a gas lens therebetween, the back element of the pair having a convex back surface and the front element of the pair having a concave front surface whose radius of curvature is less than that of the convex back surface of the back element of the pair, the pair of elements in combination with the gas lens therebetween being of positive power.

Preferably the back element of the pair is of positive power while the front element of the pair is of negative power. The gas lens between the elements of the pair is preferably of negative power.

The back element of the pair is preferably meniscus in form having a concave front surface which preferably has a radius of curvature greater than that of its convex back surface. The front element of the pair is also preferably meniscus in form having a convex back surface which preferably has a radius of curvature greater than that of its concave front surface. Thus, the gas lens between the elements of the pair is preferably bounded at the back by a front concave surface of the back element of the pair and at the front by a back convex surface of the front element of the pair, the back convex surface of the front element of the pair having a radius of curvature greater than that of the front concave surface of the back element of the pair.

In some circumstances, particularly those where a very high level of correction of pupil aberrations is required, there is preferably associated with the "eye-piece" system a positively powered field lens located near the intermediate image formed in the optical system or telescope. Such intermediate image is preferably formed in a gas space between the field lens and the front element of said pair of elements. The field lens is preferably located close to that front element to define a gas lens bounded by the front surface of that front element and the back surface of the field lens. This gas lens is preferably of negative power and may be of similar shape to the gas lens between the elements of said pair of elements.

The present invention further provides a non-Gallilean afocal infra-red optical system or afocal infra-red telescope comprising an objective lens system in combination with an "eye-piece" system as set forth above. The objective lens system and the "eye-piece" system may be designed to provide good imagery independently or, if this is not a requirement, then the "eye-piece" system can be designed to compensate for residual aberrations from the objective lens system. The powered elements of the objective lens system may, for example, all be refracting elements or, as a further example, the objective lens system may be a catadioptric system including reflecting powered elements.

The lens elements may be of germanium for the thermal 8 to 13 micron waveband, or a combination of silicon and germanium may be used for the 3 to 5.5 micron waveband. Conveniently the spaces between elements are occupied by air, the gas lenses mentioned above then being air lenses. Preferably the curved refractive surfaces of all the elements are of spherical curvature.

The present invention further provides an infra-red optical system comprising an objective lens system for producing a real image from infra-red radiation from a distant scene or object, an "eye-piece" system as set forth above positioned to receive infra-red radiation from that image and to provide a collimated magnified view of the scene or object at a real exit pupil, and scanning means operative at that exit pupil to scan the collimated magnified view via imaging means across infra-red detector means.

BRIEF DESCRIPTION OF THE DRAWINGS

An embodiment of non-Gallilean afocal infra-red optical system or infra-red afocal telescope in accordance with the invention will now be described by way of example with reference to the accompanying drawings in which.

DESCRIPTION OF THE PREFERRED EMBODIMENT

Figure 1:
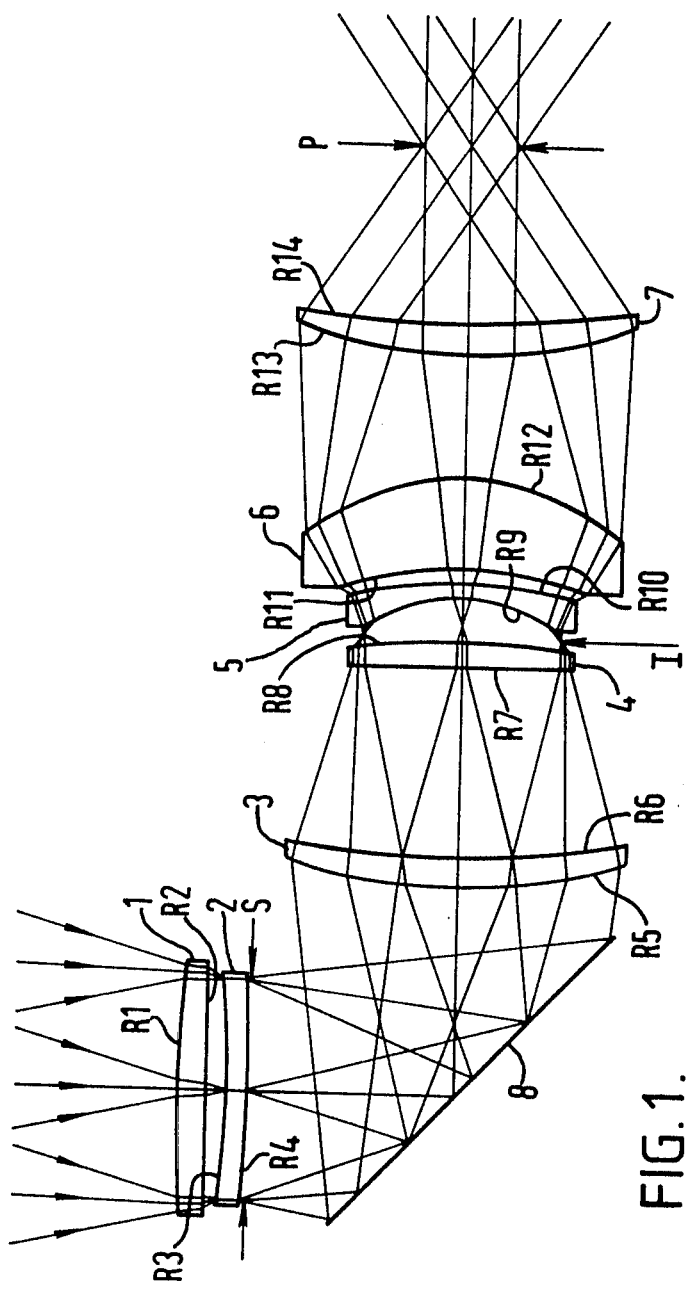
FIG. 1 is a schematic representation of the optical system or telescope.

The afocal telescope shown in the drawing comprises an objective lens system consisting of lens elements 1, 2 and 3, a field lens element 4, and an "eye-piece" lens system consisting of a pair of lens elements 5 and 6, and a back element 7. A plane mirror 8 is disposed in the radiation path between the elements 2 and 3 of the objective lens to bend the radiation path through the lens, such bend being shown as 90 degrees. The telescope has an aperture stop S at or adjacent the objective lens element 2. An intermediate image I is formed between the field lens element 4 and the "eye-piece" lens element 5. The exit pupil of the telescope is indicated at P.

In use, infra-red radiation from a distant scene or object is received by the objective lens system and focussed to form a real image at position I. The "eye-piece" system "views" the intermediate image I and provides a collimated, magnified view of the scene or object viewable at the real exit pupil P. The effect is to reduce the diameter of a collimated beam of infra-red radiation incident on the telescope.

Figure 2:
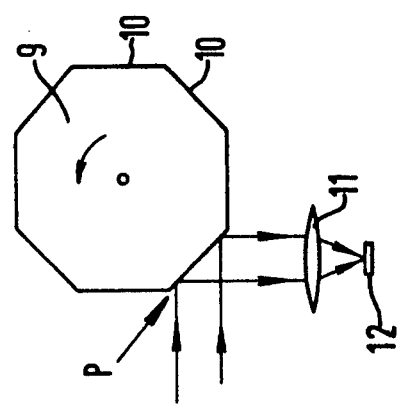
FIG. 2 is a schematic representation of a scanning device.

The exit pupil P is coincident with the operational or in-action facet of an optical scanning head 9 (FIG. 2) having a plurality of reflective facets 10 and which is rotated at constant angular velocity. As the head rotates, each facet scans the collimated radiation via an imaging lens 11 across an infra-red detector array 12, successive scans being effected by successive facets passing through the exit pupil position in a manner known per se. Such scanning arrangement is similar to that schematically shown and described in the previously mentioned United States Patent Application Ser. No. 904,439.

For convenience, the end of the telescope which, in use, faces towards the scene or object and receives the incident radiation is referred to as the front, while the end facing towards the exit pupil P is referred to as the back. References to front and back in relation to lens elements and their respective refracting surfaces are to be construed accordingly.

The front lens element 1 of the objective lens system is a positive bi-convex singlet element having convex front and back surfaces R1 and R2. The lens element 2, which is closely spaced from the element 1, is a negative meniscus singlet element, concave to the front, having a concave front surface R3 and a convex back surface R4. The back element 3 of the objective lens system, which receives radiation transmitted through the aperture stop S by reflection from the mirror 8, is a positive meniscus singlet element, convex to the front, having a convex front surface R5 and a concave rear surface R6.

The field lens element 4 is a positive singlet element shown as plano-convex having a front planar surface R7 and a back convex surface R8. However, this field element 4 can have other shapes and the front surface R7 may alternatively be concave or convex and the back surface R8 may alternatively be planar or concave.

The front element 5 of the pair of elements 5 and 6 in the 'eye-piece' system is a negative meniscus singlet element, concave to the front, having a concave front surface R9 and a convex back surface R10 of greater radius of curvature than the front surface R9. The element 5 is fairly closely spaced from the field element 4 to define a negative gas, and conveniently air, lens between the surfaces R8 and R9 (the intermediate image I being located in this space). The back element 6 of the pair of elements 5 and 6 is a positive meniscus singlet element concave to the front having a front concave surface R11 of greater radius of curvature than its back convex surface R12. The element 6 may be somewhat thicker than, for example about six to eight times as thick as, the element 5. The radius of curvature of the front concave surface R9 of the element 5 is shorter than the radius of curvature of the back convex surface R12 of the element 6. The elements 5 and 6 are closely spaced to define a negative gas, which gas may conveniently be air, lens between the surfaces R10 and R11, the radius of curvature of the convex surface R10 being larger than the radius of curvature of the concave surface R11. The combination of the pair of elements 5 and 6 with the air (or other gas) lens therebetween is positive in power. The back element 7 of the 'eye-piece' system is a positive singlet element having a convex front surface R13 and shown as meniscus convex to the front with a concave back surface R14. However, the back surface R14 can alternatively be convex so that the element 7 is bi-convex.

The elements 1 to 7 are, of course, all of an infra-red transmitting material and are preferably all of the same material. This may be germanium if the telescope is to operate with radiation in the thermal 8 to 13 micron waveband. A combination of germanium and silicon may be used to operate with radiation in the 3 to 5.5 micron waveband. The spaces between elements are occupied by gas and conveniently air. Preferably the surfaces R1 to R14 are all of spherical curvature.

By an arrangement as described above, fields of view of around 70 degrees or more (in the scanner space) can be achieved before pupil aberrations become excessive. The air lens between the pair of elements 5 and 6 enables additional control over pupil aberrations to be provided by the difference in surface curvature on either side of the air lens. Best correction of pupil aberrations is given by an air lens which is negative in power, being bounded by a convex surface R10 and a stronger (shorter radius of curvature) concave surface R11, the four surfaces R9 to R12 having the same sign of curvature, i.e. their centres of curvature all lying on the same side (to the front) of the pair of elements.

The power of the air lens between the elements 5 and 6 can give the 'eye-piece' an inconveniently long exit pupil clearance so that the wide field of view in the scanner space would require a very large diameter 'eye-piece'. Also, the Petzval curvature of the 'eye-piece' may be overcorrect by more than the amount required to correct the Petzval curvature of the objective. However, these problems can be alleviated by the positively powered field lens 4 placed close to the intermediate image I between the objective lens system and the 'eye-piece' lens system. This field lens forms another air lens between the field lens 4 and the front element 5 of the 'eye-piece' system, which air lens can be of negative power and may be of similar shape to that of the air lens between the pair of elements 5 and 6. The air lens between the field lens 4 and the element 5 also has a beneficial effect on pupil aberrations, the combination of the two air lenses giving very good control over both the shape and the position of the exit pupil up to wide angles off-axis of up to 75 degrees in the scanner space.

Particular examples of afocal telescopes in accordance with the above described embodiment have numerical data as follows. The dimensional units are millimeters but the values are relative and can be scaled accordingly. The surfaces R1 to R14 are all of spherical curvature in each example. The material of the elements 1 to 7 is germanium in each case, the examples being designed to cover the thermal 8 to 13 micron waveband, and the spaces between the elements are air spaces.

EXAMPLE 1

| Element | Surface | Radius of Curvature | Axial Thickness/ Separation |
|---|---|---|---|
| 1 | R1 | +559.792 | |
| | R2 | −2171.13 | 8.717 |
| | | | 6.789 |
| 2 | R3 | −304.239 | |
| | R4 | −491.581 | 7.132 |
| | | | 137.160 |
| 3 | R5 | +188.496 | |
| | R6 | +335.513 | 9.880 |
| | | | 63.315 |
| 4 | R7 | −5331.65 | |
| | R8 | −315.991 | 7.925 |
| 5 | R9 | −61.079 | 14.094 |
| | R10 | −180.950 | 5.080 |
| 6 | R11 | −133.405 | 4.894 |
| | R12 | −66.059 | 29.325 |
| 7 | R13 | +167.247 | 40.994 |
| | R14 | +411.769 | 10.302 |

Magnification × 2.42
Field of View 70 degrees in scanner space
Exit Pupil Diameter 31 millimeters

EXAMPLE 2

| Element | Surface | Radius of Curvature | Axial Thickness/ Separation |
|---|---|---|---|
| 1 | R1 | +569.852 | |
| | R2 | −2980.39 | 8.030 |
| | | | 5.660 |
| 2 | R3 | −308.818 | |
| | R4 | −429.083 | 7.030 |
| | | | 129.410 |
| 3 | R5 | +192.863 | |
| | R6 | +248.110 | 8.780 |
| | | | 56.250 |
| 4 | R7 | +185.853 | |
| | R8 | +500.384 | 8.020 |
| | | | 28.130 |
| 5 | R9 | −82.657 | |
| | R10 | −252.638 | 5.460 |
| | | | 5.460 |
| 6 | R11 | −127.622 | |
| | R12 | −103.520 | 41.830 |
| | | | 32.850 |
| 7 | R13 | +172.984 | |
| | R14 | −429.083 | 11.500 |

Magnification × 2.43; FOV; 70 degrees in scanner space
Exit Pupil Diameter 31 millimeters It will be noted that in Example 1 the field lens element 4 is meniscus concave to the front having a concave front surface R7 and a convex back surface R8, whereas in Example 2 the field lens element 4 is meniscus convex to the front having a convex front surface R7 and a concave back surface R8. This is because in Example 2 the spacing between the surfaces R8 and R9, i.e. the axial thickness of that air lens, is greater than in Example 1 so that in Example 2 the field lens 4 is farther from the intermediate image I and tends effectively to provide a back part of the objective lens system, thus requiring a shape which reduces the angles of incidence. In Example 1 the field lens 4 is nearer the intermediate image I and its shape is less critical. In both examples, however, the air lens between the field lens element 4 and the 'eye-piece' front element 5 is of negative power.

It will further be noted that in Example 2 the back element 7 of the 'eye-piece' lens system is meniscus convex to the front having a convex front surface R13 and a concave back surface R14, whereas in Example 2 the back element 7 is bi-convex having convex front and back surfaces R13 and R14.

The extra parameters made available by an arrangement as described above give the possibility of good imagery of an object, such as a temperature reference, placed at the intermediate image position I between the objective lens system and the collimator 'eye-piece' lens system. In the two specific examples set forth above the 'eye-piece' has been optimised to give a good image of an object placed at some position around the periphery of the real world intermediate image: this object thus appears farther off-axis than would the real world image when viewed from the scanner space, the off-axis obliquity being greater than ±35 degrees. It should be noted that this particular requirement limits the choice of objective lens system design since the objective system must also be capable of giving a reasonably good image independently of the 'eye-piece' system.

It will be appreciated that, if good imagery is not required of the objective system and the 'eye-piece' system independently, then a wide variety of types of objective lens systems may be used with the described 'eye-piece' system as the number of parameters in the 'eye-piece' system allow flexibility in compensating for the residual aberrations.

A further particular example of infra-red afocal telescope in accordance with the invention has numerical data as set forth below. In this Example 3 the objective lens system consists of a meniscus element 1 convex to the front, a bi-convex element 2, and a bi-convex element 3. The element 3 could possibly be considered as a field lens element but it is located some distance from the intermediate image I (and further therefrom than the field lens element 4 in Example 2 above) and has quite a strong imaging effect. It is therefore identified as the back element 3 of the objective lens system, and there is no element 4 in Example 3. In this example the 'eye-piece' system consists of a pair of meniscus elements 5 and 6 concave to the front with an air lens therebetween and a back meniscus element 7 convex to the front which is located, in this particular example, very close to the back element 6 of the pair. In Example 3 the thicknesses of the elements 5 and 6 are not greatly different but their aggregate thickness is such that the pair of elements with the negative air lens therebetween is, in combination of positive power, whilst having an outer concave surface R9 of shorter radius of curvature than the outer convex surface R10. Example 3 provides a smaller exit pupil P than the other two examples given above and a certain level of residual pupil aberration is intentionally provided to give an elliptically shaped exit pupil. It will be understood that in the following table there are no surfaces R7 and R8 because there is no element 4.

EXAMPLE 3

| Element | Surface | Radius of Curvature | Axial Thickness/ Separation |
|---|---|---|---|
| 1 | R1 | +269.357 | |
| | | | 6.858 |
| | R2 | +113.406 | |
| | | | 45.720 |
| 2 | R3 | +2202.662 | |
| | | | 9.144 |
| | R4 | −263.157 | |
| | | | 186.436 |
| 3 | R5 | +699.526 | |
| | | | 8.001 |
| | R6 | −678.667 | |
| | | | 41.910 |
| 5 | R9 | −43.336 | |
| | | | 8.001 |
| | R10 | −146.465 | |
| | | | 11.430 |
| 6 | R11 | −63.154 | |
| | | | 12.276 |
| | R12 | −46.862 | |
| | | | 0.640 |
| 7 | R13 | +44.034 | |
| | | | 7.620 |
| | R14 | +56.889 | |

Magnification × 5.0
Field of View 72 degrees in scanner space
Exit Pupil Diameter 10 millimeters In Example 3, as with Examples 1 and 2, all the refracting surfaces are of spherical curvature, and all the lens elements are of germanium, the example being designed to operate in the 8 to 13 micron waveband.

As previously indicated, for operation in the 3 to 5.5 micron waveband a combination of germanium and silicon lens elements may be used, such combination being preferable to the use of silicon for all the elements because silicon alone would give a lot of chromatic aberration. Specifically, an afocal telescope in accordance with the above described embodiment for operation with infra-red radiation in the 3 to 5.5 micron waveband could have lens element 2 of germanium and the other lens elements of silicon.

In the embodiment shown, the "eye-piece" system is used in combination with an objective lens system whose powered elements are all refracting elements. It will be understood that the "eye-piece" system could be used in combination with a catadioptric objective lens system comprising reflecting powered elements.

I claim:

1. An "eye-piece" system for use in a non-Gallilean, afocal, infra-red optical system or afocal, infra-red telescope in which an intermediate image is formed, the "eye-piece" system comprising at least three lens elements of infra-red transmitting material operative with radiation in at least one of the 3 to 5.5 and 8 to 13 micron wavebands, the three lens elements including a back element of positive power having a back surface which is either convex or concave, a front surface which is convex, and a pair of elements which are closely spaced to define a gas lens therebetween, the back element of the pair having a convex back surface and the front element of the pair having a concave front surface, the pair of elements in combination with the gas lens therebetween being of positive power.

2. An "eye-piece" system for use in a non-Gallilean, afocal, infra-red optical system or afocal, infra-red telescope, the "eye-piece" system comprising at least three lens elements of infra-red transmitting material operative with radiation in at least one of the 3 to 5.5 and 8 to 13 micron wavebands, the three lens elements including a back element of positive power having a back surface which is either convex or concave, a front surface which is convex, and a pair of elements which are closely spaced to define a gas lens therebetween, the back element of the pair having a convex back surface and the front element of the pair having a concave front surface with an absolute value of radius of curvature less than that of the convex back surface of the back element of the pair, the pair of elements in combination with the gas lens therebetween being of positive power.

3. An "eye-piece" system according to claim 1 or claim 2 in which the back element of the pair is of positive power while the front element of the pair is of negative power.

4. An "eye-piece" system according to claim 1 or claim 2 in which the gas lens between the elements of the pair is of negative power.

5. An "eye-piece" system according to claim 1 or claim 2 in which the back element of the pair is meniscus in form having a concave front surface.

6. An "eye-piece" system according to claim 5 in which the back element of the pair has a concave front surface whose radius of curvature has an absolute value greater than that of its convex back surface.

7. An "eye-piece" system according to claim 1 or claim 2 in which the front element of the pair is meniscus in form and has a convex back surface.

8. An "eye-piece" system according to claim 7 in which the front element of the pair has a convex back surface whose radius of curvature has an absolute value greater than that of its concave front surface.

9. An "eye-piece" system according to claim 1 or claim 2 in which the gas lens between the elements of the pair is bounded at the back by a front concave surface of the back element of the pair and at the front by a back convex surface of the front element of the pair, the back convex surface of the front element of the pair having a radius of curvature with an absolute value greater than that of the front concave surface of the back element of the pair.

10. An "eye-piece" system according to claim 1 or claim 2 having an associated, positively powered, field lens located near the position of the intermediate image formed in the optical system or telescope.

11. An "eye-piece" system according to claim 10 in which there is a gas space between the field lens and the front element of said pair of elements, and the intermediate image position is in that gas space.

12. An "eye-piece" system according to claim 10 in which the field lens is located close to the front element of said pair of elements to define a gas lens bounded by the front surface of that front element and the back surface of the field lens.

13. An "eye-piece" system according to claim 12 in which the gas lens between the field lens and said front element is of negative power.

14. An "eye-piece" system according to claim 12 in which the gas lens between the field lens and said front element is of similar shape to the gas lens between the elements of said pair of elements.

15. An "eye-piece" system according to claims 1 or 2 and an objective lens system for collecting and transmitting infra-red radiation thereto.

16. An "eye-piece" system according to claim 15 wherein the "eye-piece" system is designed to compensate for residual aberrations from said objective lens system.

17. An "eye-piece" system according to claim 1 or claim 2 and an objective lens system for producing a real image from infra-red radiation from a distant scene or object, said "eye-piece" system positioned to receive infra-red radiation from said real image and to provide a collimated, magnified view of the scene or object at a real exit pupil, and scanning and detector means operative at said exit pupil to scan the collimated, magnified view via imaging means across infra-red detector means.

18. An "eye-piece" system according to claim 1 or claim 2 in which the infra-red transmitting material is selected from germanium and silicon.

19. An "eye-piece" system for use in a non-Gallilean, afocal, infra-red optical system or afocal, infra-red telescope, the "eye-piece" system comprising three lens elements 5, 6 and 7 whose surfaces R9 to R14 have radii of curvature, and whose elements have axial thicknesses and separations substantially as follows:

| Element | Surface | Radius of Curvature | Axial Thickness/ Separation |
|---|---|---|---|
| 5 | R9 | −61.079 | |
| | | | 5.080 |
| | R10 | −180.950 | |
| | | | 4.894 |
| 6 | R11 | −133.405 | |
| | | | 29.325 |
| | R12 | −86.059 | |
| | | | 40.994 |
| 7 | R13 | +167.247 | |
| | | | 10.302 |
| | R14 | +411.769 | |

20. An "eye-piece" system for use in a non-Gallilean, afocal, infra-red optical system or afocal, infra-red telescope, the "eye-piece" system comprising three lens elements 5, 6 and 7 whose surfaces R9 to R14 have radii of curvature, and whose elements have axial thicknesses and separations substantially as follows:

| Element | Surface | Radius of Curvature | Axial Thickness/ Separation |
|---|---|---|---|
| 5 | R9 | −82.657 | |
| | | | 5.460 |
| | R10 | −252.638 | |
| | | | 5.460 |
| 6 | R11 | −127.622 | |
| | | | 41.830 |
| | R12 | −103.520 | |
| | | | 32.850 |
| 7 | R13 | +172.984 | |
| | | | 11.500 |
| | R14 | −429.083 | |

21. An "eye-piece" system for use in a non-Gallilean afocal, infra-red optical system or afocal, infra-red telescope, the "eye-piece" system comprising three lens elements 5, 6 and 7 whose surfaces R9 to R14 have radii of curvature, and whose elements have axial thicknesses and separations substantially as follows:

| Element | Surface | Radius of Curvature | Axial Thickness/ Separation |
|---|---|---|---|
| 5 | R9 | −43.336 | |
| | | | 8.001 |
| | R10 | −146.465 | |
| | | | 11.430 |
| 6 | R11 | −63.154 | |
| | | | 12.276 |
| | R12 | −46.862 | |
| | | | 0.640 |
| 7 | R13 | +44.034 | |
| | | | 7.620 |
| | R14 | +56.889 | |

22. A non-Gallilean, afocal, infra-red optical system or afocal, infra-red telescope comprising lens elements 1 to 7 whose surfaces R1 to R14 have radii of curvature, and whose elements have axial thicknesses and separations substantially as follows:

| Element | Surface | Radius of Curvature | Axial Thickness/ Separation |
|---|---|---|---|
| 1 | R1 | +559.792 |  |
|  |  |  | 8.717 |
|  | R2 | −2171.13 |  |
|  |  |  | 6.789 |
| 2 | R3 | −304.239 |  |
|  |  |  | 7.132 |
|  | R4 | −491.582 |  |
|  |  |  | 137.160 |
| 3 | R5 | +188.496 |  |
|  |  |  | 9.880 |
|  | R6 | +335.513 |  |
|  |  |  | 63.315 |
| 4 | R7 | −5331.65 |  |
|  |  |  | 7.925 |
|  | R8 | −315.991 |  |
|  |  |  | 14.094 |
| 5 | R9 | −61.079 |  |
|  |  |  | 5.080 |
|  | R10 | −180.950 |  |
|  |  |  | 4.894 |
| 6 | R11 | −133.405 |  |
|  |  |  | 29.325 |
|  | R12 | −86.059 |  |
|  |  |  | 40.994 |
| 7 | R13 | +167.247 |  |
|  |  |  | 10.302 |
|  | R14 | +411.769 |  |

23. A non-Gallilean, afocal, infra-red optical system or afocal, infra-red telescope comprising lens elements 1 to 7 whose surfaces R1 to R14 have radii of curvature, and whose elements have axial thicknesses and separations substantially as follows:

| Element | Surface | Radius of Curvature | Axial Thickness/ Separation |
|---|---|---|---|
| 1 | R1 | +569.852 |  |
|  |  |  | 8.030 |
|  | R2 | −2980.39 |  |
|  |  |  | 5.660 |
| 2 | R3 | −308.818 |  |
|  |  |  | 7.030 |
|  | R4 | −429.083 |  |
|  |  |  | 129.410 |
| 3 | R5 | +192.863 |  |
|  |  |  | 8.780 |
|  | R6 | +248.110 |  |
|  |  |  | 56.250 |
| 4 | R7 | +185.853 |  |
|  |  |  | 8.020 |
|  | R8 | +500.384 |  |
|  |  |  | 28.130 |
| 5 | R9 | −82.657 |  |
|  |  |  | 5.460 |
|  | R10 | −252.638 |  |
|  |  |  | 5.460 |
| 6 | R11 | −127.622 |  |
|  |  |  | 41.830 |
|  | R12 | −103.520 |  |
| 7 | R13 | +172.984 |  |
|  |  |  | 32.850 |
|  | R14 | −429.083 |  |
|  |  |  | 11.500 |

24. A non-Gallilean, afocal, infra-red optical system or afocal, infra-red telescope comprising lens elements 1 to 3 and 5 to 7 whose surfaces R1 to R6 and R9 to R14 have radii of curvature, and whose elements have axial thicknesses and separations substantially as follows:

| Element | Surface | Radius of Curvature | Axial Thickness/ Separation |
|---|---|---|---|
| 1 | R1 | +269.357 |  |
|  |  |  | 6.858 |
|  | R2 | +113.406 |  |
|  |  |  | 45.720 |
| 2 | R3 | +2202.662 |  |
|  |  |  | 9.144 |
|  | R4 | −263.157 |  |
|  |  |  | 186.436 |
| 3 | R5 | +699.526 |  |
|  |  |  | 8.001 |
|  | R6 | −678.667 |  |
|  |  |  | 41.910 |
| 5 | R9 | −43.336 |  |
|  |  |  | 8.001 |
|  | R10 | −146.465 |  |
|  |  |  | 11.430 |
| 6 | R11 | −63.154 |  |
|  |  |  | 12.276 |
|  | R12 | −46.862 |  |
|  |  |  | 0.640 |
| 7 | R13 | +44.034 |  |
|  |  |  | 7.620 |
|  | R14 | +56.889 |  |

25. An "eye-piece" system for use in a non-Gallilean, afocal, infra-red optical system or afocal, infra-red telescope, the "eye-piece" system comprising at least three lens elements including a back element of positive power having a back surface which is either convex or concave, a front surface which is convex, and a pair of singlet elements which are closely spaced to define a gas lens therebetween, the back singlet element of the pair having a convex back surface and the front singlet element of the pair having a concave front surface, the pair of singlet elements in combination with the gas lens therebetween being of positive power.

26. An "eye-piece" system for use in a non-Gallilean, afocal, infra-red optical system or afocal, infra-red telescope, the "eye-piece" system comprising at least three lens elements including a back element of positive power having a back surface which is either convex or concave, a front surface which is convex, and a pair of singlet elements which are closely spaced to define a gas lens therebetween, the back singlet element of the pair having a convex back surface and the front singlet element of the pair having a concave front surface with an absolute value of radius of curvature less than that of the convex back surface of the back singlet element of the pair, the pair of singlet elements in combination with the gas lens therebetween being of positive power.

* * * * *